(12) United States Patent
Webster et al.

(10) Patent No.: US 7,170,880 B2
(45) Date of Patent: Jan. 30, 2007

(54) SAMPLE RATE CHANGE BETWEEN SINGLE-CARRIER AND MULTI-CARRIER WAVEFORMS

(75) Inventors: Mark A. Webster, Indian Harbour Beach, FL (US); Michael J. Seals, Melbourne, FL (US)

(73) Assignee: Conexant, Inc., Red Bank, NJ (US)

( * ) Notice: Subject to any disclaimer, the term of this patent is extended or adjusted under 35 U.S.C. 154(b) by 1157 days.

(21) Appl. No.: 10/191,221

(22) Filed: Jul. 9, 2002

(65) Prior Publication Data

US 2003/0072284 A1 Apr. 17, 2003

Related U.S. Application Data

(63) Continuation-in-part of application No. 10/143,134, filed on May 10, 2002, now Pat. No. 6,754,195.

(60) Provisional application No. 60/329,676, filed on Oct. 16, 2001.

(51) Int. Cl.
*H04Q 7/24* (2006.01)
(52) U.S. Cl. ....................... 370/338; 370/344
(58) Field of Classification Search ................ 370/338, 370/343, 344, 203, 204, 206
See application file for complete search history.

(56) References Cited

U.S. PATENT DOCUMENTS 5,241,545 A 8/1993 Kazecki et al.

(Continued)

FOREIGN PATENT DOCUMENTS

JP 2000 101623 A 4/2000

(Continued)

OTHER PUBLICATIONS

"Draft Supplement to Standard [for] Information Technology—Telecommunications and information exchange between systems—Local and metropolitan area networks—Specific Requirements—Part 11: Wireless LAN Medium Access Control (MAC) and Physical Layer (PHY) specifications: High Speed Physical Layer in the 5 GHz Band", *IEEE P802.11a/D7.0(Supplement to IEEE Std 802.11-1999)*, Jul. 1999, 90 pages.

(Continued)

*Primary Examiner*—Brian Nguyen
(74) *Attorney, Agent, or Firm*—Thomas, Kayden, Horstemeyer & Risley

(57) ABSTRACT

A Baseband transmitter for a radio frequency (RF) communication device according to an embodiment of the present invention includes a single-carrier processor, a pulse shape filter, a multi-carrier processor and a signal combiner. The single-carrier processor generates a single-carrier signal at a first sample rate. The pulse shape filter includes multiple polyphase filters which filter the single-carrier signal according to a time shaping pulse that approximates a multi-carrier power spectrum and a sample switch that selects outputs of the polyphase filters at a second sample rate. The multi-carrier processor generates a multi-carrier signal at the second sample rate. The signal combiner combines the filtered single-carrier signal with the multi-carrier signal while maintaining phase, gain, frequency and timing alignment.

34 Claims, 11 Drawing Sheets

U.S. PATENT DOCUMENTS

| | | | |
|---|---|---|---|
| 5,425,050 | A | 6/1995 | Schreiber et al. |
| 6,067,391 | A | 5/2000 | Land |
| 6,128,276 | A | 10/2000 | Agee |
| 6,344,807 | B1 | 2/2002 | Hassner et al. |
| 6,434,119 | B1 | 8/2002 | Wiese et al. |
| 6,912,261 | B2* | 6/2005 | Aslanis et al. .............. 375/364 |
| 7,009,932 | B2* | 3/2006 | Matheus et al. ............ 370/208 |
| 7,010,062 | B2* | 3/2006 | Joshi et al. ................. 375/326 |

FOREIGN PATENT DOCUMENTS

WO     WO 03 005652 A     1/2003

OTHER PUBLICATIONS

"Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Higher speed Physical Layer (PHY) extension in the 2.4 GHz band", *IEEE Std 802.11b/D7.0, (Draft Supplement to IEEE Std 802.11 1999 Edition)*, Jul. 1999, 94 pages.

"Information technology—Telecommunications and information exchange between systems—Local and metropolitan area networks,—Specific requirements—Part 11: Wireless LAN Medium Access Control (MAC) and Physical Layer (PHY) Specifications", *ISO/IEC 8802-11:1999(E) ANSI/IEEE Std 802.11, 1999 Edition*, Aug. 1999, 531 pages.

Written Opinion, dated Aug. 13, 2002, 4 pages.

Webster, Mark and Halford, Steve, "Reuse of 802.11 Preambles with HRb OFDM," IEEE 802.11-00/390, Nov. 1, 2000, pp. 1-36, XP002217331.

Lambrette U., et al., "OFDM Burst Frequency Synchronization by Single Carrier Training Data," IEEE Communications Letters, IEEE Service Center, Piscataway, U.S., vol. 1, No. 2, Mar. 1, 1997, pp. 46-48, XP000687090.

Nee Van R., et al, "New High-Rate Wireless Lan Standards," IEEE Communications Magazine, IEEE Service Center, Piscataway, N.J., U.S., vol. 37, No. 12, Dec. 1999, pp. 82-88, XP000908328.

"Supplement to IEEE standard for information technology—telecommunications and information exchange between systems—local and metropolitan area networks—specific requirements. Part 11: wireless LAN Medium Access Control (MAC) and Physical Layer (PHY) specifications: high-speed physical layer in the 5GHZ Band," IEEE STD 802.11A-1999, Dec. 30, 1999, pp. 1-90, XP0021899725.

PCT Notification of Transmittal of the International Search Report or the Declaration, dated Nov. 12, 2002, 4 pages.

Deneire L., et al, "Training Sequence vs. Cyclic Prefix A new look on Single Carrier Communication," IEEE Global Telecommunications Conference, vol. 2 of 4, Nov. 27, 2000-Dec. 1, 2000, pp. 1056-1060, XP001017246, New York, US, ISBN: 0-7803-6542-X.

PCT Notification of Transmittal of the International Search Report or the Declaration dated Mar. 24, 2003, 5 pages.

Steve Halford et al: "IEEE P802.11 Wireless LANs, CCK-OFDM Proposed Normative Text," Jul. 10, 2001, XP002242971, Retrieved from the Internet: <URL:http://grouper.ieee.org/groups/802/11/Documents/D1T401-450.html>, pp. 52-66.

Crochiere R E et al: "Interpolation and Decimation of Digital Signals—A Tutorial Review," Proceeding of the IEEE, IEEE. New York, US, vol. 69, No. 3, Mar. 1, 1981, pp. 300-331, XP000615159, ISSN: 0018-9219, p. 301, left—hand column, last paragraph—right-hand column, paragraph 5, figures 15, 18 and 20A, section II-B, section III-C.

Adams R: "Asynchronous Conversion Thwarts Incompatibility in Sampling A/D Systems" EDN Electrical Design News, Cahners Publishing Co. Newton, Massachusetts, US, vol. 39, No. 15, Jul. 21, 1994, pp. 83-88, XP000491530, ISSN: 0012-7515, section "Synchronous rate-conversion theory".

PCT Notification of Transmittal of the International Search Report or the Declaration, dated Jun. 30, 2003, 5 pages.

PCT Notification of Transmittal of International Preliminary Examination Report, 7 pages.

* cited by examiner

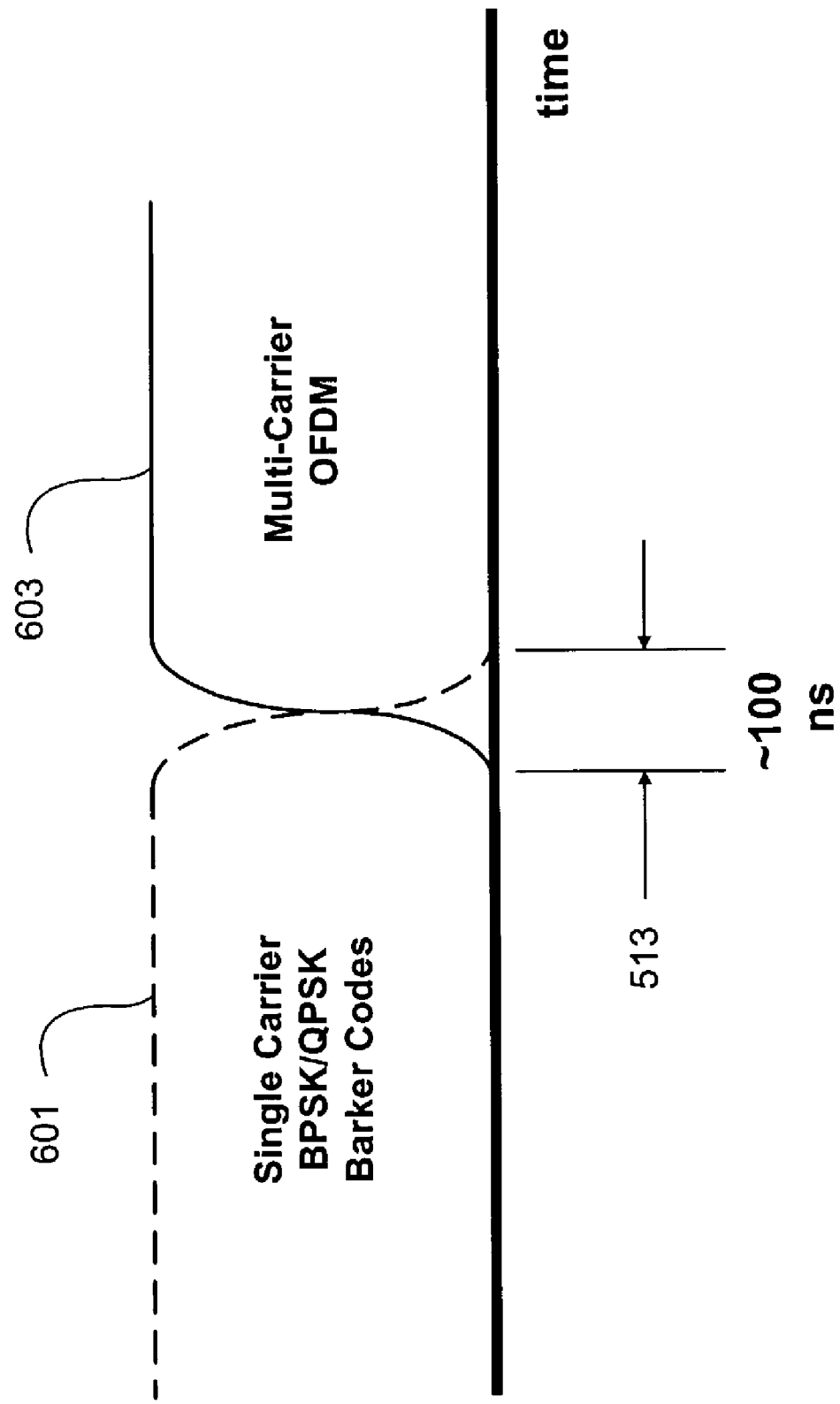

SAMPLE RATE CHANGE BETWEEN SINGLE-CARRIER AND MULTI-CARRIER WAVEFORMS

CROSS-REFERENCE TO RELATED APPLICATIONS

The present application is based on U.S. Provisional Patent Application entitled "Sample Rate Change Between Single-Carrier and Multi-Carrier Waveforms", Ser. No. 60/329,676, filed Oct. 16, 2001, which is hereby incorporated by reference in its entirety. The present application is also a continuation-in-part (CIP) of U.S. patent application entitled "Wireless Communication System Configured to Communicate Using a Mixed Waveform Configuration", Ser. No. 10/143,134, filed May 10, 2002 now U.S. Pat. No. 6,754,195, which is hereby incorporated by reference in its entirety.

FIELD OF THE INVENTION

The present invention relates to wireless communications, and more particularly to a wireless Baseband transmitter configured to communicate using a mixed carrier signal with sample rate change between single-carrier and multi-carrier waveforms.

BACKGROUND OF THE INVENTION

The Institute of Electrical and Electronics Engineers, Inc. (IEEE) 802.11 standard is a family of standards for wireless local area networks (WLAN) in the unlicensed 2.4 and 5 Gigahertz (GHz) bands. The current IEEE 802.11b standard defines various data rates in the 2.4 GHz band, including data rates of 1, 2, 5.5 and 11 Megabits per second (Mbps). The 802.11b standard uses direct sequence spread spectrum (DSSS) with a chip rate of 11 Megahertz (MHz), which is a serial modulation technique. The IEEE 802.11a standard defines different and higher data rates of 6, 12, 18, 24, 36 and 54 Mbps in the 5 GHz band. The FCC has also approved a modified version of 802.11a to run in a licensed band near 6 GHz. It is noted that systems implemented according to the 802.11a and 802.11b standards are incompatible and were not designed to work together.

A new IEEE standard is being proposed, referred to as 802.11g (the "802.11g proposal"), which is a high data rate extension of the 802.11b standard at 2.4 GHz. It is noted that, at the present time, 802.11g is only a proposal and is not yet a completely defined standard. Several significant technical challenges are presented for the new 802.11g proposal. It is desired that the 802.11g devices be able to communicate at data rates higher than the standard 802.11b rates in the 2.4 GHz band. In some configurations, it is desired that the 802.11b and 802.11g devices be able to coexist in the same WLAN environment or wireless area without significant interference or interruption from each other, regardless of whether the 802.11b and 802.11g devices are able to communicate with each other. Thus, it is desired that 802.11g be backwards compatible with 802.11b devices. It may further be desired that the 802.11g and 802.11b devices be able to communicate with each other, such as at any of the standard 802.11b rates.

An impairment to wireless communications, including WLANs, is multi-path distortion where multiple echoes (reflections) of a signal arrive at the receiver. Other types of interferences, such as different and incompatible wireless signal types, may cause problems with WLAN communications. The Bluetooth standard, for example, defines a low-cost, short-range, frequency-hopping WLAN. Systems implemented according to the Bluetooth standard present a major source of interference for 802.11-based systems. Both the single-carrier systems and multi-carrier systems include equalizers that are designed to combat various types of distortion. The equalizers are typically designed to use the preamble to achieve good receiver acquisition. One proposal to implement 802.11g is a mixed mode configuration including a single-carrier segment with a preamble and header and a multi-carrier segment with a payload. The traditional multi-carrier system, however, was not designed to utilized the information obtained from a single-carrier preamble. Losing all information when transitioning from single-carrier to multi-carrier is not desirable in the presence of multi-path distortion or other types of interference.

There are also several potential problems with the signal transition between single- and multi-carrier signals, particularly with legacy equipment. The transmitter may experience analog transients (e.g., power, phase, filter delta), power amplifier back-off (e.g. power delta) and power amplifier power feedback change. The receiver may experience Automatic Gain Control (AGC) perturbation due to power change, spectral change, multi-path effects, loss of channel impulse response (CIR) (multi-path) estimate, loss of carrier phase, loss of carrier frequency, and loss of timing alignment.

A mixed waveform configuration for wireless communications was previously disclosed in U.S. Provisional Patent Application entitled, "Wireless Communication System Configured to Communicate Using a Mixed Waveform Configuration", Serial No. 60/306,438 filed on Jul. 6, 2001, which is incorporated by reference in its entirety. The system described therein reused the equalizer information obtained during acquisition of the single-carrier portion of the signal. The technique provided continuity between the single-carrier and multi-carrier segments (e.g., orthogonal frequency division multiplexing or OFDM), which was achieved by specifying the transmit waveform completely for both the single-carrier and multi-carrier segments and specifying the transition. The waveform enabled continuity between the two signal segments, including AGC (power), carrier phase, carrier frequency, timing and spectrum (multi-path). It was contemplated that the signal would not have to be reacquired by the multi-carrier portion of the receiver since the information developed during the single-carrier portion (preamble/header) was valid and used to initiate capture of the multi-carrier portion. However, particular receiver architectures were not discussed.

A mixed carrier wireless architecture has been previously disclosed in U.S. Provisional Patent Application entitled, "Single-Carrier to Multi-Carrier Wireless Architecture", Ser. No. 60/325,048 filed on Sep. 26, 2001, which is incorporated by reference in its entirety. The wireless architecture described therein is capable of communicating using the proposed mixed carrier waveform configuration. The term "mixed carrier" refers a combined signal with a single-carrier portion followed by a multi-carrier portion. The transmitter could be configured to operate in multiple operating modes including single-carrier, mixed carrier and multi-carrier modes. Furthermore, several receiver architectures were described that are configured to receive a mixed carrier signal and resolve the Baseband signals incorporated in the mixed carrier signal.

A Baseband transmitter and receiver architecture according to one embodiment of the prior disclosure achieves coherency across the single-carrier to multi-carrier transition by maintaining gain, phase, frequency, sample timing and Channel Impulse Response (CIR) from the single-carrier signal to the multi-carrier signal of a mixed carrier signal. In this manner, the signal does not have to be reacquired by the multi-carrier portion of the receiver since the information developed during the single-carrier portion is valid and used to initiate capture of the multi-carrier portion. Maintaining and accumulating information makes the signal much more robust in the face of common interferences experienced in wireless communications. A Baseband receiver architecture according to an alternative embodiment was also described that does not preserve the coherency across the transition, so that the multi-carrier portion of the receiver must completely re-acquire the signal after the transition. A multi-carrier preamble may be used for this purpose. Yet another non-coherent receiver embodiment was disclosed that utilizes selected information gained from the single-carrier portion of the waveform, such as any selected parameter associated with gain, phase, frequency or timing. Although the non-coherent architectures are less robust than the coherent configurations, the non-coherent options may be easier and cheaper to implement while remaining sufficiently robust to achieve a suitable communication system for many applications.

A technical challenge of the mixed carrier transmitters is rate changing either or both of the single-carrier and multi-carrier signals so that they may be combined in a coherent manner. Several rate changing techniques are described herein.

SUMMARY OF THE PRESENT INVENTION

A Baseband transmitter for a radio frequency (RF) communication device according to an embodiment of the present invention includes a single-carrier processor, a pulse shape filter, a multi-carrier processor and a signal combiner. The single-carrier processor generates a single-carrier signal at a first sample rate. The pulse shape filter includes multiple polyphase filters which filter the single-carrier signal according to a time shaping pulse that approximates a multi-carrier power spectrum and a sample switch that selects outputs of the polyphase filters at a second sample rate. The multi-carrier processor generates a multi-carrier signal at the second sample rate. The signal combiner combines the filtered single-carrier signal with the multi-carrier signal while maintaining phase, gain, frequency and timing alignment.

The time shaping pulse may be sampled and decomposed into the polyphase filters of the pulse shape filter in accordance with the second sample rate. In one configuration, a selected number of polyphase filters is used to up-sample the single-carrier signal to an intermediate rate, where the time shaping pulse is sampled based on the intermediate rate, where each of the polyphase filters has a selected number of taps that incorporate tap coefficients based on samples of the time shaping pulse, and where the sample switch selects outputs of the plurality of polyphase filters to down-sample to the second sample rate. Alternatively, a selected number of polyphase filters is used to up-sample the single-carrier signal to the second sample rate, where the time shaping pulse is sampled according to the second sample rate, where each of the polyphase filters has a selected number of taps that incorporate tap coefficients based on samples of the time shaping pulse, and where the sample switch selects each output of the plurality of polyphase filters at the second sample rate. In a specific example of the latter case, the first sample rate is 11 megahertz (MHz), the second sample rate is 44 MHz, the time shaping pulse is converted to discrete samples based on a 44 MHz rate, and 11 polyphase filters are used with 9 taps each.

A first of the polyphase filters may be selected to have a center tap having a coefficient that corresponds with a peak magnitude of the sampled time shaping pulse. In this case, the signal combiner of the Baseband transmitter may further include a combiner and a soft switch. The combiner combines the filtered single-carrier signal with the multi-carrier signal and provides a combined mixed carrier signal. The soft switch selects the filtered single-carrier signal until a last sample is completed and selects the combined mixed carrier signal during a transition period. Furthermore, the last sample of the single-carrier signal at the first sample rate is positioned at the center tap of the first polyphase filter at the beginning of the transition period.

The Baseband transmitter may further include a rate change filter. The multi-carrier processor generates a multi-carrier signal at a third sample rate rather than the second sample rate. In one embodiment, the rate change filter converts the multi-carrier signal from the third sample rate to the second sample rate. The rate change may include an internal rate change filter that converts a sample rate of the multi-carrier signal from the third sample rate to a fourth sample rate, and a first-in, first-out (FIFO) buffer that converts the multi-carrier signal from the fourth sample rate to the second sample rate. Alternatively, the rate change filter includes multiple polyphase filters that up-sample to an intermediate frequency and a sample switch that selects outputs of the plurality of polyphase filters at the second sample rate. In the latter case, a selected number of polyphase filters of the rate change filter may be used to up-sample the multi-carrier signal to the intermediate frequency, where each of the polyphase filters has a selected number of filter taps with coefficients to incorporate a low pass filter (LPF) based on the intermediate frequency, and where the sample switch selects outputs of the plurality of polyphase filters to down-sample the multi-carrier signal to the second sample rate. In a specific embodiment, the third sample rate is 20 MHz, the second sample rate is 44 MHz, 11 polyphase filters are used with 21 taps each, and the sample switch selects every $5^{th}$ output of the 11 polyphase filters to achieve a 44 MHz rate. 10

A center tap of a first polyphase filter of the rate change filter may be selected to have a largest magnitude coefficient. The polyphase filters of the rate change filter may each be initialized with a cyclic extension of a first multi-carrier symbol. The signal combiner may further include a phase multiplier, a combiner and a soft switch. The phase multiplier multiplies the multi-carrier signal by a phase based on the single-carrier signal and provides a rotated multi-carrier signal. The combiner combines the filtered single-carrier signal and the rotated multi-carrier signal and provides a combined mixed carrier signal. The soft switch selects the filtered single-carrier signal until completed, selects the combined mixed carrier signal during a transition period, and selects the rotated multi-carrier signal at the end of the transition period until completed. The single-carrier signal may include consecutive chips according to a predetermined timing interval and where the transition period has a duration equivalent to the predetermined timing interval. The time shaping pulse may be sampled and decomposed into the polyphase filters of the pulse shape filter, where a center tap of a first of the polyphase filters is selected to have a coefficient that corresponds with a peak magnitude of the sampled time shaping pulse. In this case, the combiner is operated so that a last chip of the single-carrier signal is located at the center tap of the first of the polyphase filters of the pulse shape filter at the beginning of the transition period. Also, the combiner is operated so that a first full sample of the multi-carrier signal is located at the center tap of the first polyphase filter of the plurality of polyphase filters of the rate change filter at the end of the transition period.

A method of generating a mixed carrier packet for RF transmission according to an embodiment of the present invention includes generating a single-carrier segment including a preamble and header according to a single-carrier modulation scheme at a first sample rate, filtering the single-carrier samples according to a time shaping pulse that approximates a multi-carrier power spectrum and selecting filtered samples at a second sample rate, generating a multi-carrier payload using a selected multi-carrier modulation scheme that provides multi-carrier samples at the second sample rate, and combining the single-carrier segment with the multi-carrier payload to provide a mixed carrier packet in such a manner to maintain gain, phase, frequency and timing.

The combining may include selecting the single-carrier filtered samples, combining the filtered single-carrier filtered samples with the multi-carrier samples during a transition period in such a manner to maintain gain, phase, frequency and timing, and selecting the multi-carrier samples.

The filtering the single-carrier samples may include up-sampling to an intermediate rate using a plurality of finite impulse response (FIR) filters each having multiple taps with coefficients selected according to discrete samples of the time shape pulse based on the intermediate rate. In one embodiment, the intermediate rate may be equal to the second sample rate and the selecting filtered samples may include selecting each output of the plurality of FIR filters at the second sample rate. Alternatively, the intermediate rate is greater than the second sample rate. In this latter case, the selecting filtered samples may include down-sampling outputs by selecting outputs of the plurality of FIR filters to achieve the second sample rate. In another embodiment, the method may further include selecting the coefficients so that a center tap of a first FIR filter has a coefficient that corresponds with a peak value of the time shaping pulse. In this case, the combining the single-carrier segment with the multi-carrier payload may include selecting an output of the first FIR filter when a last sample of the single-carrier segment is positioned at the center tap of the first FIR filter at the beginning of a transition period between the single-carrier segment and the multi-carrier payload of the mixed carrier packet.

The generating a multi-carrier payload may include providing multi-carrier samples at a third sample rate rather than the second sample rate. In one case, the method may include rate change filtering the multi-carrier samples from the third sample rate to a fourth sample rate, and buffering the multi-carrier samples using a first-in, first-out (FIFO) buffer and selecting outputs of the FIFO buffer at the second sample rate.

If the generating a multi-carrier payload includes providing multi-carrier samples at a third sample rate rather than the second sample rate, the method may alternatively include rate change filtering the multi-carrier samples from the third sample rate to the second sample rate. Also, the rate change filtering the multi-carrier samples may include up-sampling to an intermediate frequency using a plurality of FIR filters each having a number of taps determined by the intermediate frequency and tap coefficients selected according to an LPF based on the intermediate frequency. The method in this case may further include selecting a center tap of a first FIR filter of the plurality of FIR filters to have a largest magnitude tap coefficient. The method may further include initializing filter taps of a rate change filter with a cyclical extension of a first multi-carrier symbol of the multi-carrier samples. The combining the single-carrier segment with the multi-carrier payload may include selecting an output of the first FIR filter of the rate change filter when a first full sample of the first multi-carrier symbol of the multi-carrier payload is positioned at the center tap of the first FIR filter of the rate change filter at the end of a transition period between the single-carrier segment and the multi-carrier payload of the mixed carrier packet.

Continuing in this latter embodiment, the filtering the single-carrier samples may include up-sampling using a plurality of FIR filters each having a number of taps with tap coefficients selected based on discrete samples of the time shape pulse. In this case, the method further includes selecting the tap coefficients of the plurality of FIR filters used for up-sampling so that a center tap of a first FIR filter has a coefficient that corresponds with a peak value of the time shaping pulse, and where the combining the single-carrier segment with the multi-carrier payload includes selecting an output of the first FIR filter when a last sample of the single-carrier segment is positioned at the center tap of the first FIR filter at the beginning of the transition period. The combining may further include rotating the multi-carrier payload by a phase determined from the filtered single-carrier segment. The single-carrier modulation scheme may be the Barker modulation and the multi-carrier modulation scheme may be orthogonal frequency division multiplexing (OFDM), where the rotating includes rotating an OFDM multi-carrier payload by a phase of a last Barker Word of the filtered single-carrier segment. In this case, the combining may include ramping the filtered single-carrier segment down while ramping the multi-carrier payload up during the transition period.

BRIEF DESCRIPTION OF THE DRAWINGS

A better understanding of the present invention can be obtained when the following detailed description of the preferred embodiment is considered in conjunction with the following drawings, in which:

FIG. 6 is a graph diagram illustrating exemplary termination of the single-carrier signal and onset of the multi-carrier signal during an overlap period.

DETAILED DESCRIPTION OF EMBODIMENTS OF THE INVENTION

The wireless devices described herein operate in the 2.4 Gigahertz (GHz) band in 802.11b or 802.11g modes or in any of several bands (multi-band) in one or more 802.11a modes, such as 2.4 GHz, 5 GHz, 6 GHz or any other suitable band. The devices may be configured in any suitable format, such as any type of computer (desktop, portable, laptop, etc.), any type of compatible telecommunication device, any type of personal digital assistant (PDA), or any other type of network device, such as printers, fax machines, scanners, hubs, switches, routers, etc. It is noted that the present invention is not limited to the 802.11g proposal, the 802.11b standard, the 802.11a standard or the 2.4, 5 and 6 GHz frequency bands, although these standards and frequencies may be utilized in certain embodiments. The wireless devices may be configured to communicate with each other at any of the standard 802.11b rates, including 1, 2, 5.5 and 11 Mbps to maintain backwards compatibility with 802.11b devices. The wireless devices may also be configured for mixed carrier mode operation to enable communicates at different or higher data rates using a mixed signal configuration according to any one of several embodiments, such as the standard 802.11a data rates of 6, 9, 12, 18, 24, 36, 48 or 54 Mbps.

The mixed signal devices may operate and/or coexist in the same wireless operating area as 802.11b devices without significant interference with each other even while operating in mixed signal mode. The mixed signal devices are illustrated using Barker Word modulation as the single-carrier modulation scheme and orthogonal frequency division multiplexing (OFDM) as the multi-carrier modulation scheme. It is appreciated, however, that the present invention is not limited to any particular modulation schemes and that alternative single-carrier and multi-carrier modulation schemes may be used.

Figure 1:
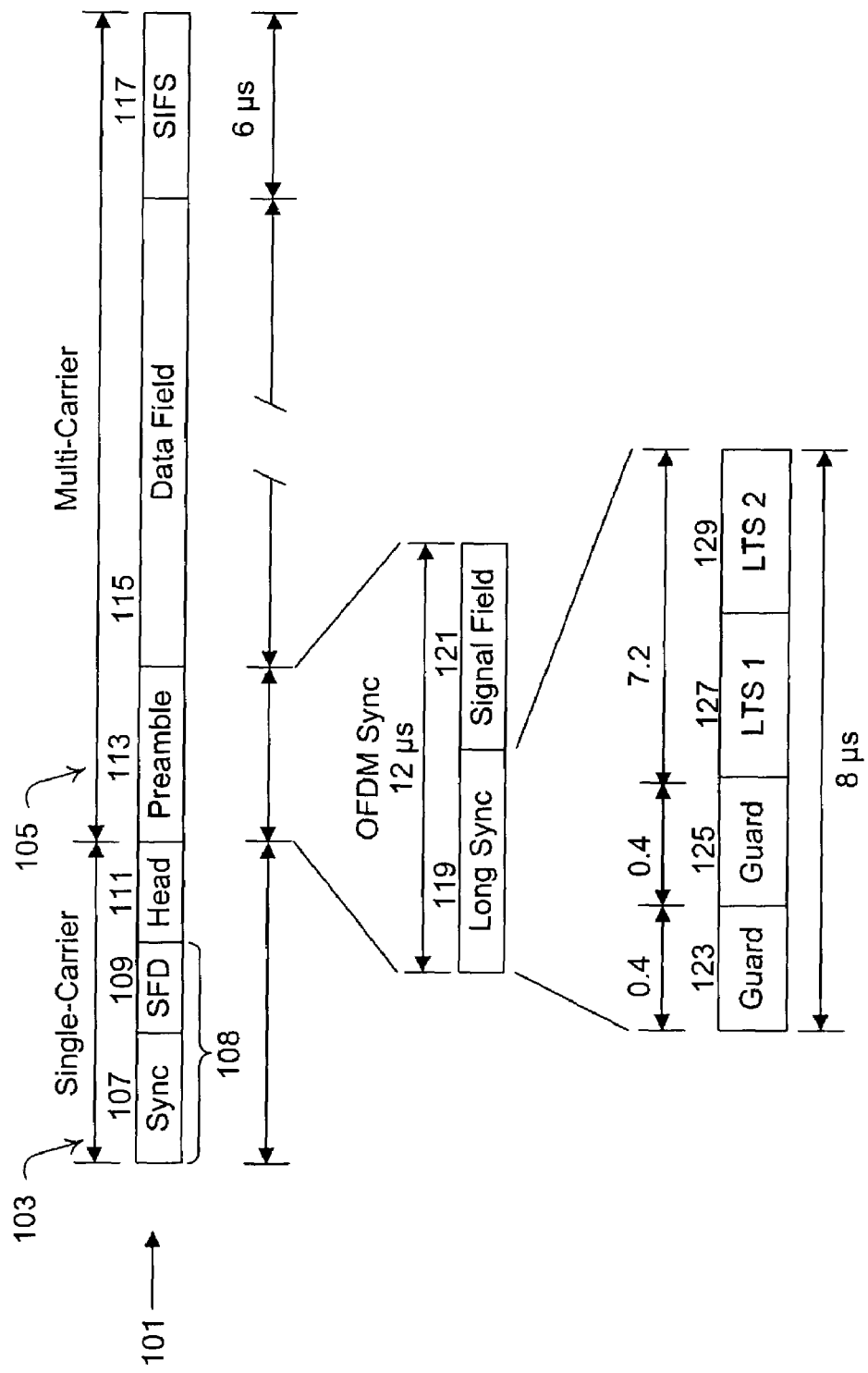
FIG. 1 is a conceptual diagram of a mixed signal packet implemented according to an embodiment of the present invention.

FIG. 1 is a conceptual diagram of a mixed signal packet 101 implemented according to an embodiment of the present invention. The packet 101 includes a single-carrier section 103 followed by a multi-carrier section 105. The single-carrier section 103 is intended to be modulated by a single-carrier modulation scheme and the multi-carrier section 105 is intended to by modulated by a multi-carrier modulation scheme. In some embodiments described herein, the single-carrier modulation is Quadrature Phase Shift Keying (QPSK) symbol rate or Binary Phase Shift Keying (BPSK), such as according to the 802.11b standard, and the multi-carrier modulation is according to OFDM, such as according to the 802.11a standard. It is understood and appreciated that other single-carrier and multi-carrier modulation schemes may be used.

In the embodiment shown, the single-carrier section 103 includes a Barker preamble 108 followed by a Barker header 111. The Barker preamble 108 includes a Sync field 107 followed by a Sync Field Delimiter (SFD) 109 and is configured according to 802.11b for Barker Word modulation. The preamble 108 and the Barker header 111 may be modulated according to BPSK or QPSK and thus may be transmitted at 1 or 2 megabits per second (Mbps). A long version of the single-carrier section 103 is transmitted in 192 microseconds (μs) and a short version is transmitted in 96 μs. The multi-carrier portion 105 includes a preamble 113, a data field 115 and a Short Interference Space (SIFS) Pad 117. The data field 115 is transmitted at a selected data rate from among typical data rates of 6, 9, 12, 18, 24, 36, 48 or 54 Mbps using OFDM modulation. The SIFs pad is transmitted in 6 μs.

The preamble 113 is used for synchronization for OFDM modulation, and includes a long sync field 119 and a signal field 121. The preamble 113 is transmitted in approximately 12 μs. The long sync field 119 includes a pair of 0.4 μs guard intervals 123, 125 and a pair of 3.6 μs long training symbols 127, 129. In this manner, it is appreciated that the total duration of the long sync field 119 is 8 μs, which is significantly shorter than the short or long versions of the single-carrier section 103 consuming at least 96 μs.

Figure 2:
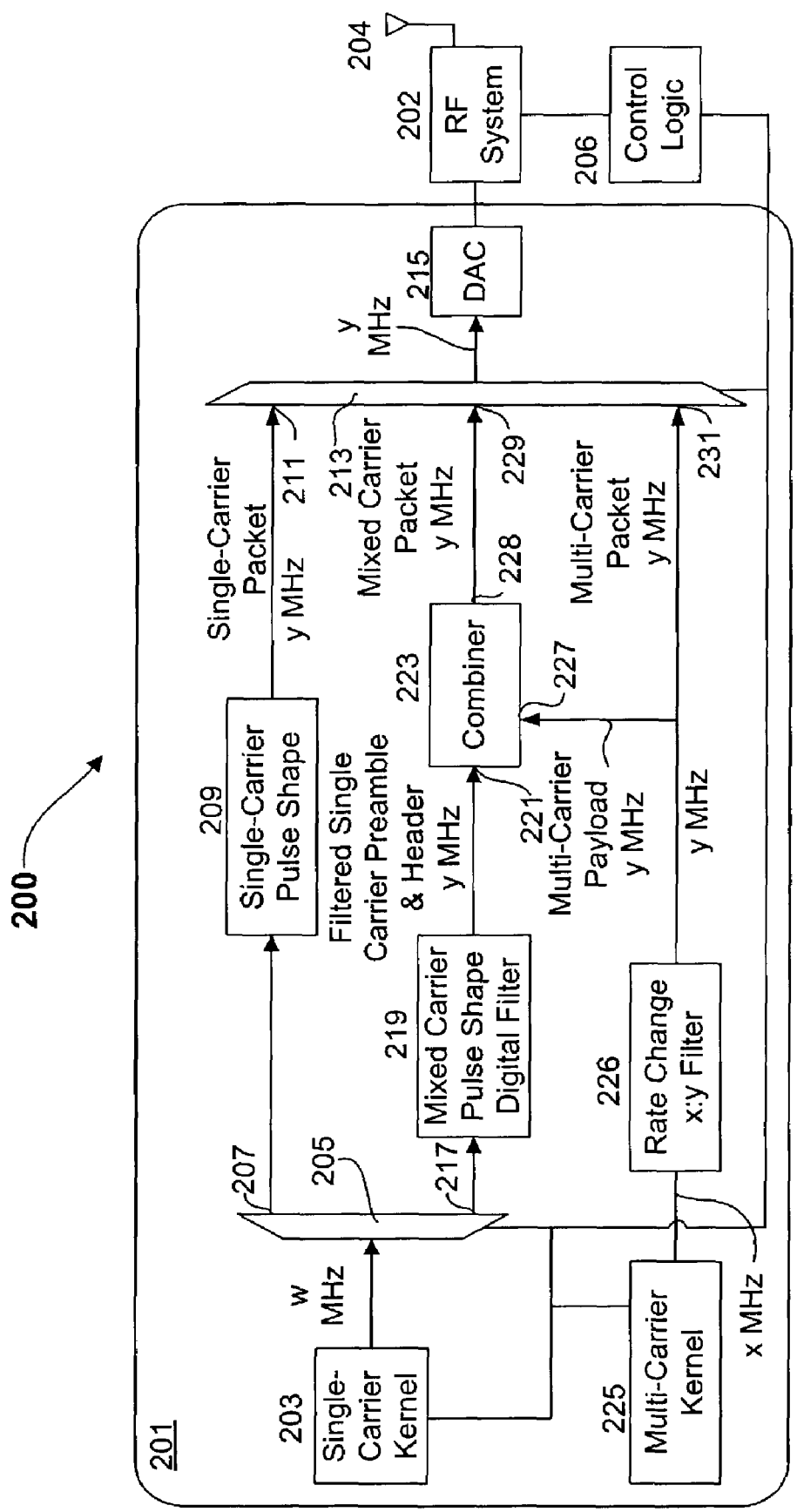
FIG. 2 is a simplified block diagram of a mixed carrier signal transmitter including a Baseband transmitter implemented according to an embodiment of the present invention.

FIG. 2 is a simplified block diagram of a mixed carrier signal transmitter 200 including a Baseband transmitter 201 implemented according to an embodiment of the present invention. In one embodiment, the transmitter 201 is configured to operate in several modes, including a single-carrier mode (e.g. 802.11b), a mixed carrier mode (802.11g), and several multi-carrier modes (e.g. 802.11a). The multi-carrier modes may employ OFDM modulation in any one of several frequency bands, such as the 2.4, 5 or 6 GHz bands. A single-carrier processor or kernel 203 incorporates the core processing functions to configure single-carrier signals at a selected chip rate "w" MHz. The chip rate may be w=11 for 802.11b, such as Barker chips at 11 MHz. The output of the kernel 203 is provided to the input of a 1:2 splitter 205. A first output 207 of the splitter 205 is provided to the input of an single-carrier pulse shape block 209 (digital filter), which outputs a single-carrier packet at a sample rate of "y" MHz. The sample rate may be any selected or suitable rate, such as 18.333, 20, 22, 40, 44 etc. MHz. The pulse shape block 209 changes the sample rate from w to y and need only meet the spectral mask of the selected single-carrier modulation scheme. The output of the single-carrier pulse shape block 209 is provided to a first input 211 of a 3:1 multiplexor (MUX) 213, having its output coupled to the input of a digital to analog converter (DAC) 215. The DAC 215 operates at a rate of y MHz to convert the digital Baseband signal into an analog signal for RF processing and transmission.

The analog output of the DAC 215 is mixed with a radio frequency (RF) signal and transmitted in a wireless medium via an antenna 204 as known to those skilled in the art. In the embodiment shown, the analog output of the DAC 215 is provided to an RF system 202, which converts the Baseband signal to an RF signal that is asserted in the wireless medium via the antenna 204. The transmitter 200 also includes control logic 206 coupled to the RF system 202 and the Baseband transmitter 201 to control the particular mode of operation. The control logic 206 controls the splitter 205 and the MUX 213 to select single-carrier packets for the single-carrier mode, to select multi-carrier packets for the multi-carrier mode, and to select mixed carrier packets for the mixed carrier mode of operation.

The RF system 202 and the control logic 206 may further be configured for multi-band operation. The RF system 202 may be configured to transmit packets using a selected one of several RF carrier frequencies including, but not limited to, the unlicensed 2.4, 5 or 6 GHz bands. It is contemplated that the 2.4 GHz band be used for the single-carrier mode in accordance with 802.11b. The 2.4 GHz band may also be employed for the mixed carrier mode to provide backwards compatibility with legacy 802.11b devices. It is contemplated that the 5 GHz band be used for the multi-carrier mode in accordance with 802.11a. It is further contemplated that several different bands be used for the multi-carrier mode (i.e., multi-band operation) including the 2.4, 5 and 6 GHz bands as well as any other selected or available frequency bands.

A second output 217 of the splitter 205 is provided to a mixed carrier pulse shape digital filter 219. The digital filter 219 receives a single-carrier preamble and header signal from the kernel 203 and shapes or filters the signal in such as manner to have a similar power spectrum as the multi-carrier signal employed for the mixed carrier waveform. As described further below, the digital filter 219 includes finite impulse response (FIR) filter taps that are scaled so that the power spectrum of the single-carrier signal approximates the power spectrum of the multi-carrier signal. The mixed carrier preamble and header output from the digital filter 219 is provided to one input 221 of a combiner 223, which receives a multi-carrier payload originating from a multi-carrier processor or kernel 225 at a second input 227. As described further below, the combiner 223 operates to combine the mixed carrier preamble and header with the multi-carrier payload to develop a mixed carrier packet at its output 228, which is coupled to a second input 229 of the MUX 213.

The kernel 225 incorporates the core processing functions to configure multi-carrier packets at a selected sample rate of "x" MHz. The sample rate "x" of the kernel 225 may be any suitable or arbitrary rate, such as 20, 22, 40, 44 etc. MHz. A sample rate of 20 MHz is in accordance with the 802.11a standard for an OFDM kernel. The output of the kernel 225 is provided to a rate change filter 226, which converts the sample rate of the kernel 225 to y MHz, which is the sample rate of the DAC 215. The output of the rate change filter 226 is provided to the input 227 of the combiner 223 and to a third input 231 of the MUX 213. The rate change filter 226 is optional and not needed if x=y or if the kernel 225 otherwise operates at the sample rate of y MHz. The configuration and operation of the rate change filter 226 is further described below.

The transmitter 201 operates in the single-carrier mode (e.g. 802.11b) when the control logic 206 controls the splitter 205 to select its first output 207 and controls the MUX 213 to select its first input 211 so that single-carrier packets generated by the kernel 203 and shaped by the pulse shape block 209 are provided to the DAC 215. The transmitter 201 operates in the mixed signal mode (e.g. 802.11g) when the control logic 206 controls the splitter 205 to select its second output 217 and controls the MUX 213 to select its second input 229 so that mixed carrier packets from combiner 223 are provided to the DAC 215. The transmitter 201 operates in a multi-carrier mode (e.g. 802.11a) when the control logic 206 controls the MUX 213 to select its third input 231 so that multi-carrier packets generated by the kernel 225 are provided to the DAC 215.

It is noted that the kernel 203 may be configured to be capable of producing an entire single-carrier packet (via pulse shaper 209) and that the kernel 225 may be configured to be capable of producing an entire multi-carrier packet. The combiner 223, however, combines the first portion or preamble and header of the single-carrier signal with the payload portion of the multi-carrier signal (e.g., including the preamble 113, the data field 115 and SIFs 117) to generate the mixed carrier packet. The single-carrier kernel 203 is further configured to modify the header 111 of the single-carrier section 103 to include a bit or field that indicates mixed carrier mode of operation. The mixed carrier mode bit informs the receiver that the packet is a mixed carrier signal rather than a single-carrier signal.

Figure 3:
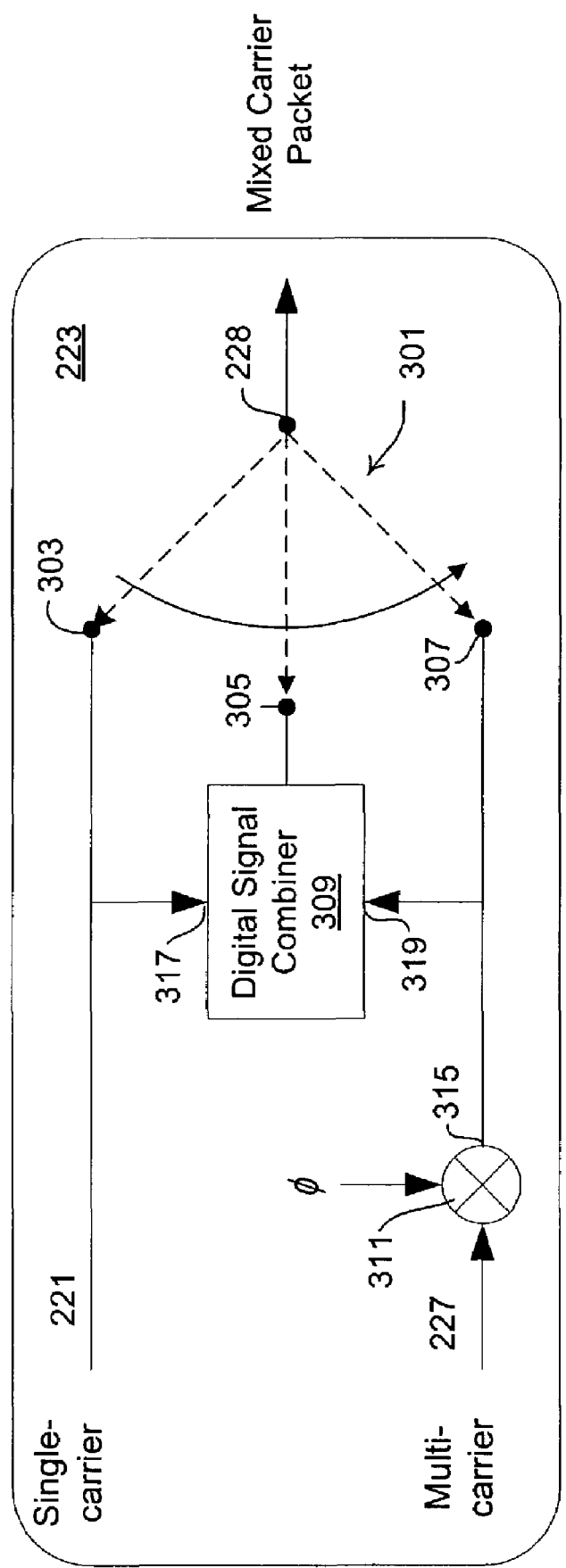
FIG. 3 is a simplified block diagram of an embodiment of the combiner of FIG. 2.

FIG. 3 is a simplified block diagram of an embodiment of the combiner 223. The combiner 223 performs phase and time alignment between the single-carrier header and preamble received via its input 221 and the multi-carrier payload received via its input 227. The combiner 223 also transitions between single-carrier header termination and multi-carrier payload onset. The combiner 223 includes a soft switch 301 that switches the output 228 between first, second and third terminals 303, 305 and 307, respectively. The soft switch 301 is not necessarily implemented as a physical or mechanical switch, but instead may be implemented in firmware or digital logic to perform smooth switching between the signals during transition. The first terminal 303 is coupled to the input 221 of the combiner 223 and to a first input 317 of a digital signal combiner 309. The second terminal 305 is coupled to the output of the digital signal combiner 309. The third terminal 307 is coupled to an output 315 of a phase rotator 311, which is also provided to a second input 319 of the digital signal combiner 309. The phase rotator 311 rotates or multiplies the multi-carrier signal by a phase angle "$\phi$" relative to the single-carrier signal (or last portion thereof) to maintain phase continuity. The digital signal combiner 309 combines the single-carrier and multi-carrier signals during the transition between the full single-carrier portion and the full multi-carrier portion of the mixed carrier signal.

Figure 4B:
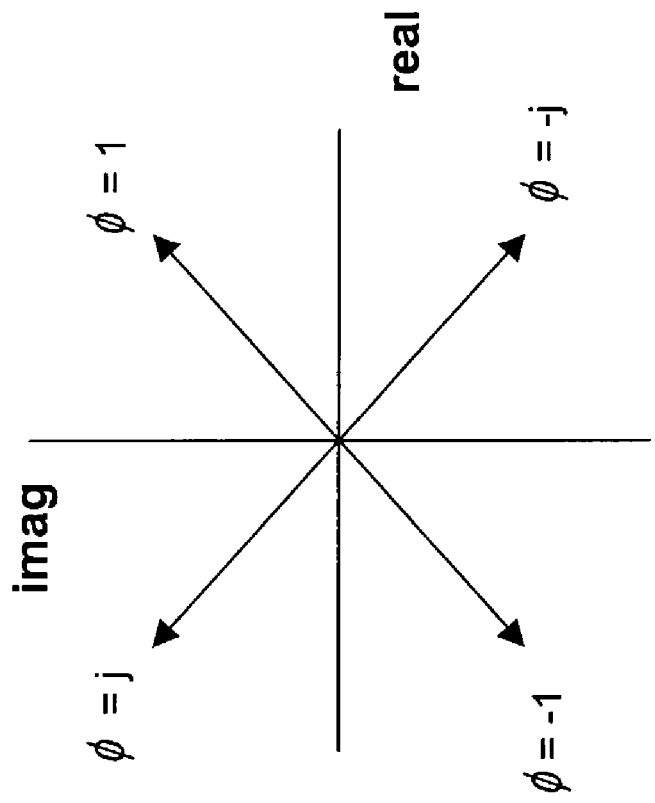
FIGS. 4A and 4B are graph diagrams of phase relationships for an exemplary single-carrier modulation scheme using either BPSK or QPSK, respectively.
Figure 4A:
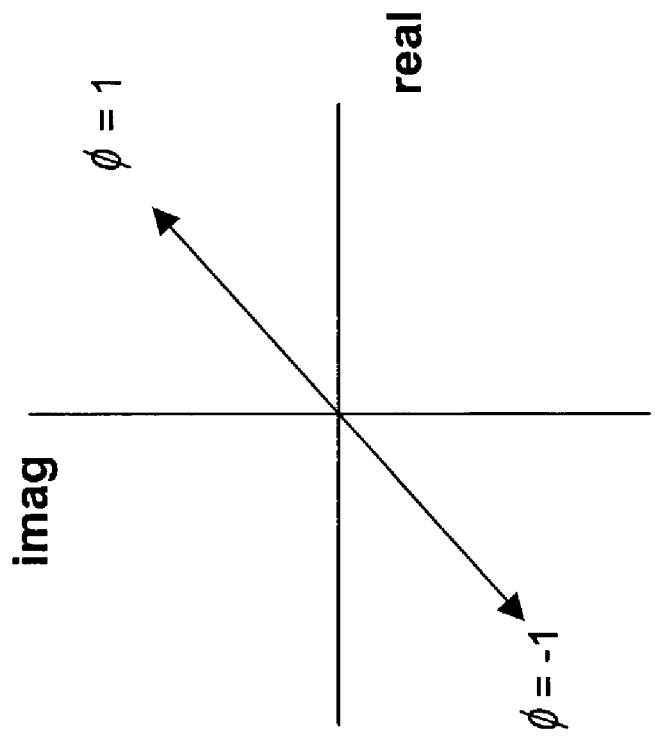

FIGS. 4A and 4B are graph diagrams of phase relationships for an exemplary single-carrier modulation scheme using either BPSK or QPSK, respectively. FIG. 4A is a graph diagram of a BPSK plot illustrating that BPSK incorporates both real and imaginary portions in two quadrants (1 of 2 phases). The phase angle $\phi$ is either 1 or −1. FIG. 4B is a simplified graph diagram of a QPSK plot illustrating that QPSK incorporates both real and imaginary portions in all four quadrants (1 of 4 phases). The phase angle φ is either 1, j, −1 or −j. The particular phase of a signal is obscured during transmission so that absolute phase is indeterminate. A receiver is typically configured to determine and track the phase of the incoming signal. However, for the mixed carrier signal, the relative phase between the single-carrier and multi-carrier portions should be maintained or otherwise determinable to facilitate acquisition by the receiver. Therefore, the phase of the multi-carrier signal is based on phase information from the signal carrier signal to facilitate receiver phase acquisition, such as the phase of the last portion of the single-carrier signal.

In the CCK-OFDM configuration, the single-carrier signals employ Direct Sequence Spread Spectrum (DSSS), which are fundamentally different than the OFDM multi-carrier signal format. For CCK-OFDM, either of the BPSK or QPSK formats may be re-used for the header. The phase of the last Barker word of an 802.11b header determines the phase of the coherent OFDM signal relative to an OFDM signal generated by the kernel 225. Referring back to FIG. 3, for CCK-OFDM, the phase rotator 311 rotates the OFDM signal by the phase angle φ of the last Barker word and asserts the rotated OFDM signal at its output 315. The rotated OFDM signal is applied to the input 319 of the digital signal combiner 309 and to the third terminal 307 of the soft switch 301. A phase angle of 1 corresponds to 0 degree rotation (no rotation), a phase angle of j corresponds to 90 degree rotation, a phase angle of −1 corresponds to 180 degree rotation and a phase angle of −j corresponds to −90 degree rotation. The multi-carrier signal, such as OFDM, is a complex number including real and imaginary parts, otherwise referred to as in-phase (I) and quadrature phase (Q) components, so that mathematically the I and Q components are multiplied by −1, j or −j.

Figure 5:
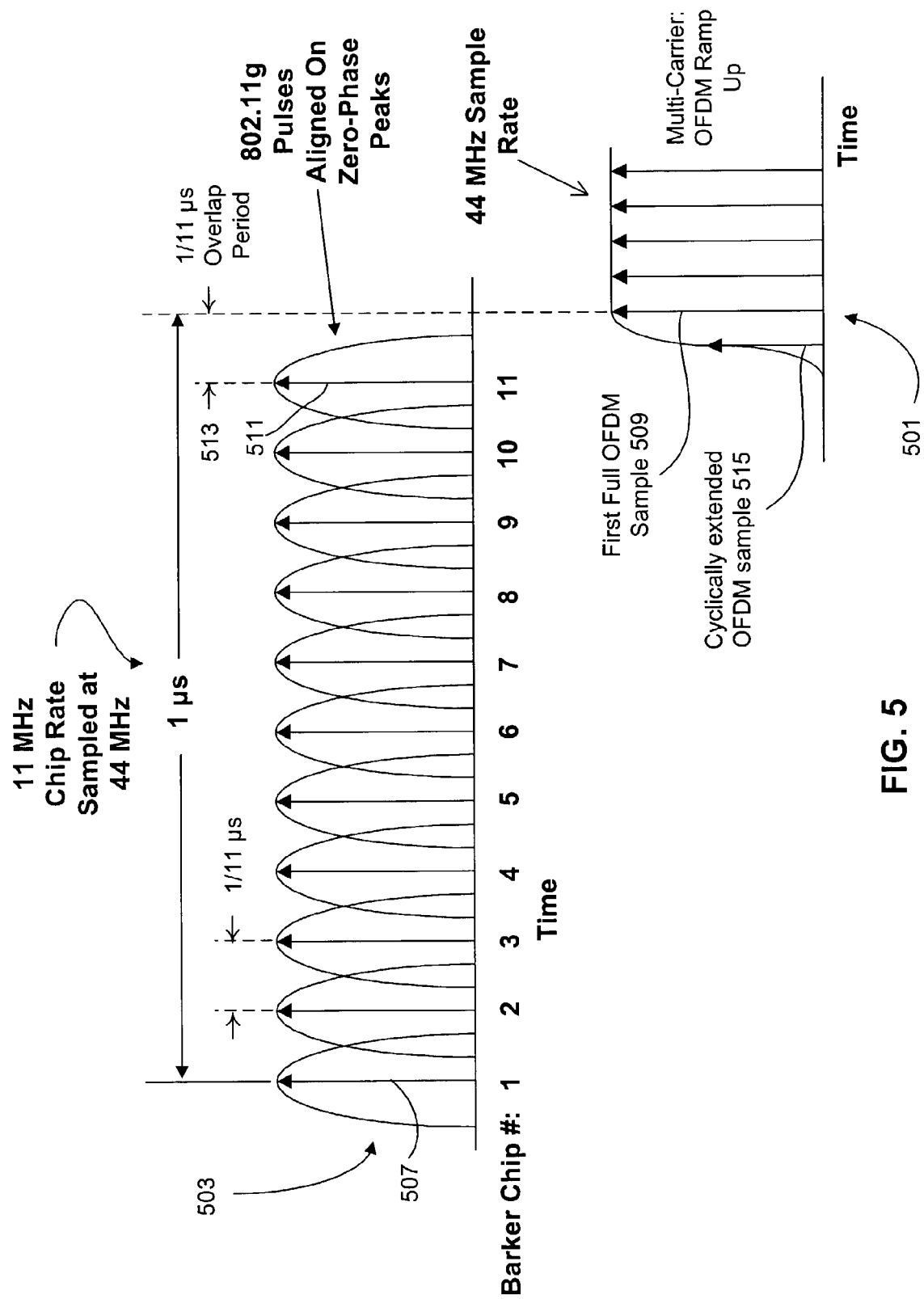
FIG. 5 is a timing diagram illustrating alignment between the single-carrier and multi-carrier portions of the signals using Barker and OFDM.

FIG. 5 is a timing diagram illustrating exemplary alignment between the single-carrier and multi-carrier portions of the signals using Barker and OFDM. The timing diagram illustrates alignment of an OFDM signal portion 501 with the last Barker word 503 of the header. The first chip of each Barker word, including the first chip of the last Barker word 503, shown at 507, is centered on the 1 μs alignment, and each subsequent Barker chip of each word is centered every $\frac{1}{11}$ μs or 91 nanoseconds (ns). For onset of the OFDM signal, the first full sample of the OFDM signal, shown at 509, occurs 1 μs after the zero-phase peak of first chip of the last Barker word in the header, and thus $\frac{1}{11}$ μs after the last chip 511 of the last Barker word thereby maintaining timing during a transition between the single- and multi-carrier segments. The period between the last chip 511 and the first full OFDM sample 509 forms a $\frac{1}{11}$ μs overlap or transition period 513 between the last Barker word 503 and the first full sample of the OFDM signal. A scaled or cyclically extended OFDM sample 515 is shown before the first full scale OFDM sample 509 to demonstrate operation of the digital combiner 317 to smooth the transition between the waveforms. In one embodiment, the OFDM sample 515 is cyclically extended in that it occurs early prior to fill onset of the OFDM sample. Such transition time alignment allows the equalizer information and the timing information to carry over between the single- and multi-carrier portions of the mixed carrier signal.

Referring back to FIG. 3, for OFDM-CCK operation, the soft switch 301 connects the first terminal 303 to the output 228 of the combiner 223 until just after the last Barker chip 511 in order to forward the last Barker word. Then, after the last Barker chip 511, the switch 301 switches to connect the output of the digital signal combiner 309 at the second terminal 305 to the output 228. The digital signal combiner 309 digitally combines the single-carrier signal at input 317 with the rotated multi-carrier signal at input 319 during the transition period 513. It is noted that a digital combiner is used since the signals are digitally sampled in the configuration shown, although analog combiners or the like are contemplated in alterative embodiments. In one embodiment, the digital signal combiner 309 ramps down the single-carrier signal while ramping up the multi-carrier signal.

In one specific configuration, the single-carrier and multi-carrier signals are both sampled at 44 MHz (y=44), and alignment is based on 11 MHz Barker chip, so there are three (3) intermediate samples between the last barker chip 511 and the first full OFDM sample 509 in the transition period 513. In one embodiment, the digital signal combiner 309 combines 75% of the Barker signal with 25% of the OFDM signal for the first intermediate sample, combines 50% of the Barker signal with 50% of the OFDM signal for the second intermediate sample, and combines 25% of the Barker signal with 75% of the OFDM signal for the third intermediate sample during the transition, which intermediate samples are provided to the output 228 on consecutive 44 MHz cycles. Before the first full OFDM sample 509, the soft switch 301 switches to connect terminal 307 with the rotated OFDM sample at the output 315 of the phase rotator 311 to the output 228, and remains at the terminal 307 for the remainder of the multi-carrier section 105.

FIG. 6 is a graph diagram illustrating exemplary termination of the single-carrier signal, shown with a dashed curve at 601 and shaped consistent with 802.11b, and onset of an OFDM symbol, shown at 603 and shaped identical to 802.11a, during the transition period 513. As illustrated in these graph diagrams, the single-carrier is terminated in a controlled fashion when transitioning from single-carrier to multi-carrier. This single-carrier termination maintains the AGC at the point of transition, minimizes the signal power gap, which in turn minimizes the corruption of one signal by the other. The single-carrier termination of the 802.11b segment is similar to that used for 802.11a OFDM shaping. The 802.11a standard specifies a windowing function for OFDM symbols, which is employed to define termination of single-carrier segment. The single-carrier signal is terminated in a predetermined window of time, such as nominally 100 nanoseconds (ns). It is not necessary to completely flush the single-carrier pulse-shaping filter. The resulting distortion to the last Barker word in the header is trivial compared to the 11 chips processing gain, thermal noise and multi-path distortion. The termination may be accomplished either explicitly in the digital signal processing or by analog filtering.

Figure 7A:
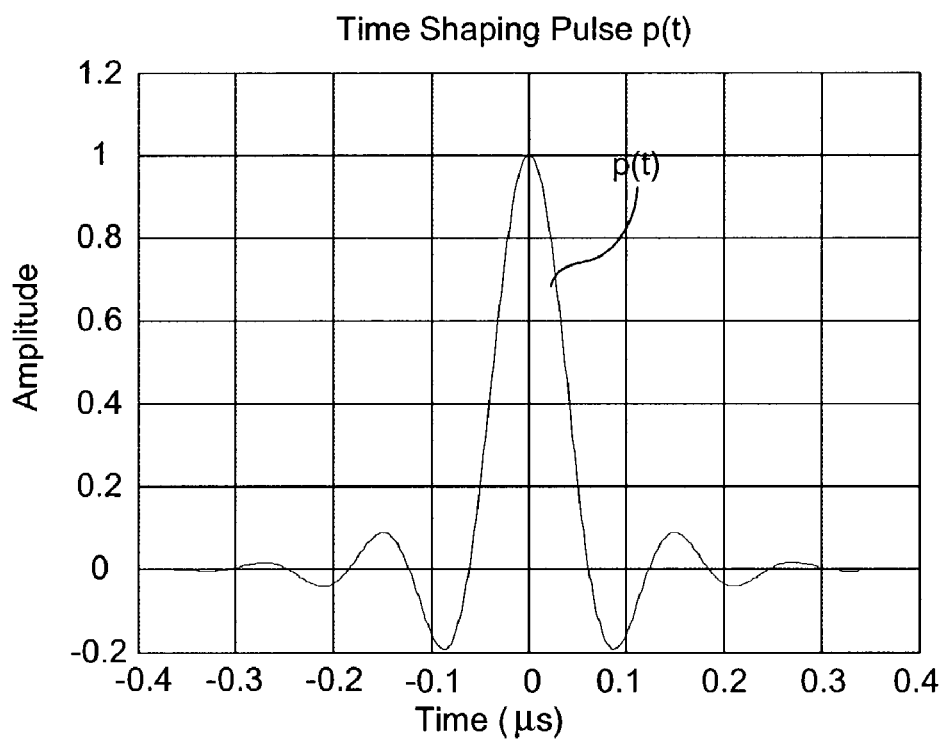
FIG. 7A is a graph diagram of an exemplary continuous time shaping pulse p(t) that is used by the pulse shape digital filter of FIG. 2 so that the power spectrum of the single-carrier portion of the mixed carrier signal approximates the power spectrum of a multi-carrier signal.

FIG. 7A is a graph diagram of an exemplary continuous time shaping pulse p(t) that is used by the pulse shape digital filter 219 so that the power spectrum of the single-carrier portion of the mixed carrier signal approximates the power spectrum of a multi-carrier signal. The graph of the time shaping pulse p(t) shows normalized amplitude plotter versus time in microseconds (μs). The specific time shaping pulse p(t) shown is specified in continuous time and is derived using an infinite impulse response of a brick wall approximation. The infinite impulse response is preferably truncated using a continuous-time window that is sufficiently long to achieve desired spectral characteristics (to approximate multi-carrier modulation) but sufficiently short to reduce complexity. The resulting continuous time pulse shape p(t) may be sampled at the sample rate (y MHz) of the DAC 215. For 802.11g using Barker and OFDM, the FIR taps are scaled such that the Barker preamble and header power spectrum approximates the OFDM power spectrum. It is appreciated that the time shaping pulse p(t) is exemplary only and that other filter shapes are contemplated to provide power (gain) matching between the single-carrier and multi-carrier spectrums.

Figure 7B:
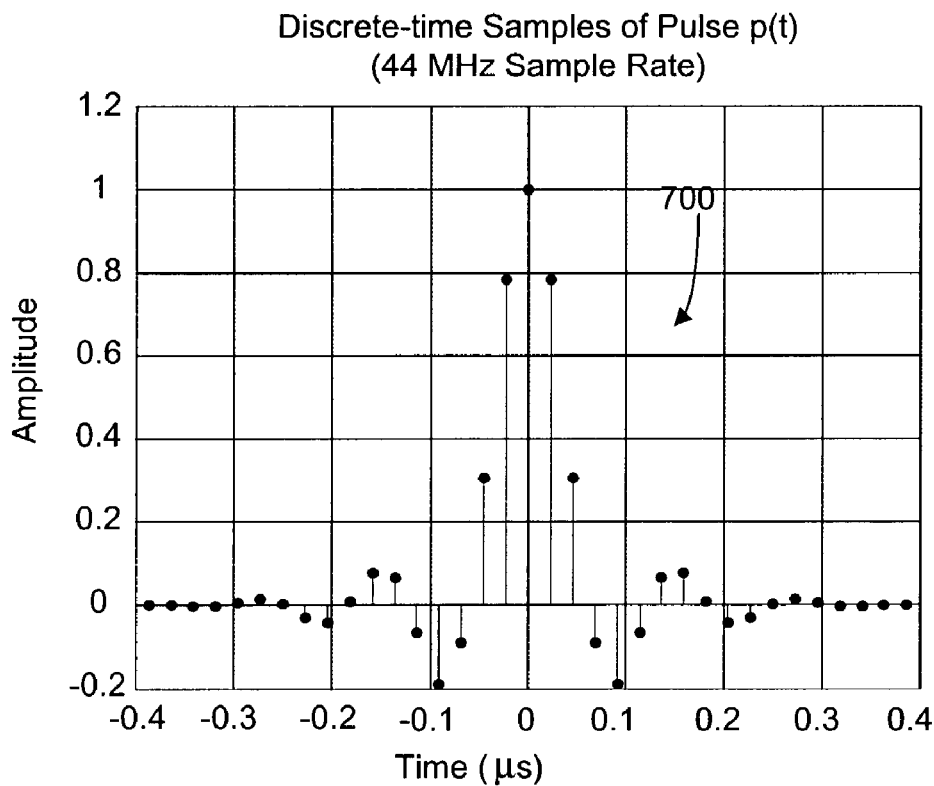
FIG. 7B is a graph diagram of discrete-time samples of the time shaping pulse p(t) based of FIG. 7A based on a sample rate of 44 MHz.
Figure 7C:
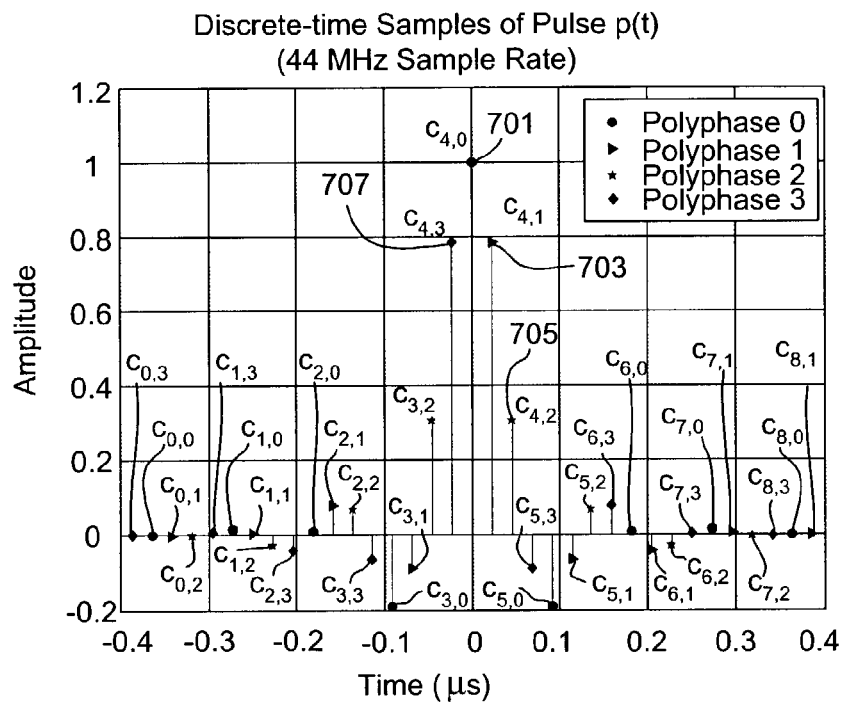
FIG. 7C is a graph diagram of the discrete-time samples of FIG. 7B further distributed among four polyphase filters.

FIG. 7B is a graph diagram of discrete-time samples 700 of the time shaping pulse p(t) based on a sample rate of 44 MHz. FIG. 7C is a graph diagram of the discrete-time samples 700 of the time shaping pulse p(t) further distributed among four polyphase filters 0, 1, 2 and 3, each represented by corresponding circle, triangle, star and diamond symbols, respectively. Each of the polyphase filters 0–3 includes multiple taps, where each tap is programmed with a coefficient "$c_{a,b}$" that corresponds to one of the discrete-time samples 700. As shown, there are 35 discrete samples 700, so that each polyphase filter includes 9 taps numbered 0–8 for a total of 36 taps. The coefficients are indexed according to tap number and filter number, where "a" is an index representing one of the tap numbers 0–8 and "b" is an index representing one of the polyphase filters 0–3. A peak sample 701 is selected to correspond to coefficient $c_{4,0}$, which is the center tap of the first polyphase filter 0. A second consecutive sample 703 is selected to correspond to coefficient $c_{4,1}$, which is the center tap of the second polyphase filter 1. A third consecutive sample 705 is selected to correspond to coefficient $c_{4,2}$, which is the center tap of the third polyphase filter 2. A fourth sample 707, being a mirrored sample of the sample 703, is selected to correspond to coefficient $c_{4,3}$, which is the center tap of the fourth polyphase filter 3.

After the center taps are determined, the remaining discrete-time samples 700 are distributed among the taps of the polyphase filters 0–3 so that every fourth sample corresponds to the next tap of the same filter. Thus, from left to right, the samples are ordered as $c_{0,3}$, $c_{0,0}$, $c_{0,1}$, $c_{0,2}$, $c_{1,3}$, $c_{1,0}$, $c_{1,1}$, $c_{1,2}$, $c_{2,3}$, $c_{2,0}$, $c_{2,1}$, $c_{2,2}$, $c_{3,3}$, $c_{3,0}$, $c_{3,1}$, $c_{3,2}$, $c_{4,3}$, $c_{4,0}$, $c_{4,1}$, $c_{4,2}$, $c_{5,3}$, $c_{5,0}$, $c_{5,1}$, $c_{5,2}$, $c_{6,3}$, $c_{6,0}$, $c_{6,1}$, $c_{6,2}$, $c_{7,3}$, $c_{7,0}$, $c_{7,1}$, $c_{7,2}$, $c_{8,3}$, $c_{8,0}$, and $c_{8,1}$. The final tap $c_{8,2}$ of the third polyphase filter 2 may be programmed with a zero or with the next consecutive point along the time shaping pulse p(t) on either side of center.

Figure 8A:
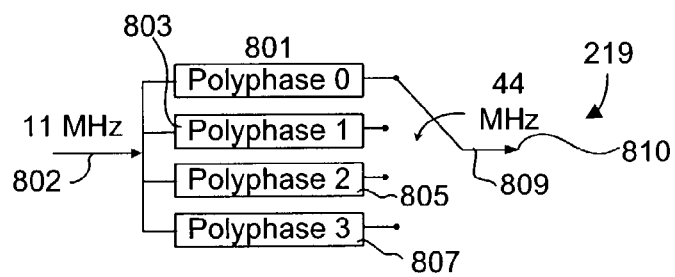
FIG. 8A is a simplified block diagram of an exemplary embodiment of the pulse shape digital filter of FIG. 2 configured to convert 11 MHz single-carrier samples to a 44 MHz sample rate and that further uses the discrete-time samples of FIG. 7B to shape the signal in such as manner to have a similar power spectrum as the multi-carrier signal employed for the mixed carrier waveform.

FIG. 8A is a simplified block diagram of an exemplary embodiment of the pulse shape digital filter 219 configured to convert 11 MHz single-carrier samples to a 44 MHz sample rate and that further uses the discrete-time samples 700 of the time shaping pulse p(t) to shape the signal in such as manner to have a similar power spectrum as the multi-carrier signal employed for the mixed carrier waveform. The polyphase filters 0–3 are shown as filters 801, 803, 805 and 807, each receiving the 11 MHz (w=11) samples from the single-carrier kernel 203 via a common input 802. In this manner, each of the single-carrier samples are shifted into each tap of each of the polyphase filters 0–3 at a rate of 11 MHz. Each of the polyphase filters 0–3 has an output that is selected by a switch 809 operating at 44 MHz, so that the outputs of the filters are provided to an output 810 of the exemplary pulse shape digital filter 219 at a new sample rate of 44 MHz.

Figure 8B:
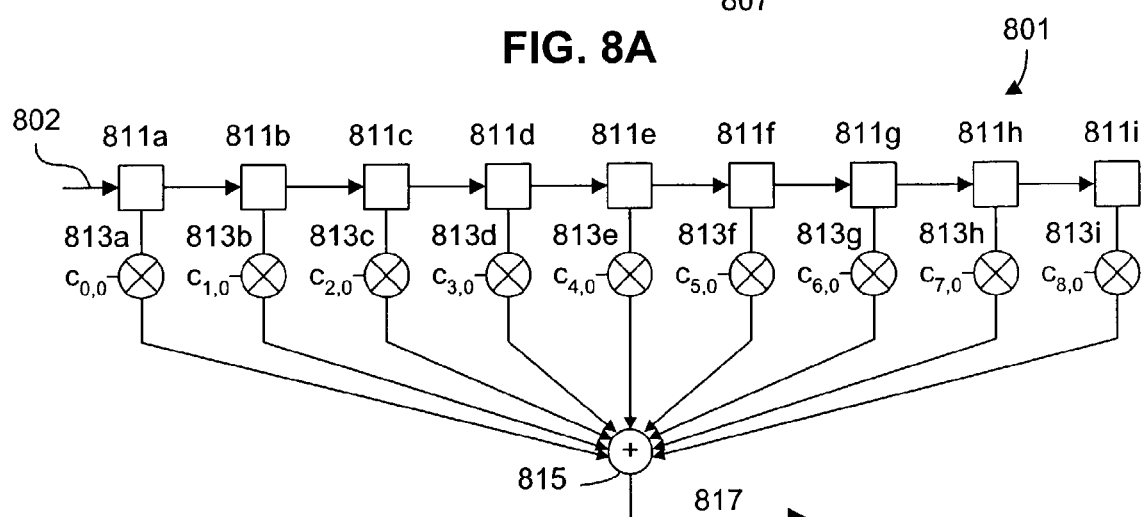
FIG. 8B is a more detailed block diagram of an exemplary embodiment of the first polyphase filter of FIG. 8A in the form of a finite impulse response (FIR) filter.

FIG. 8B is a more detailed block diagram of an exemplary embodiment of the polyphase filter 801 (the first filter 0) in the form of a FIR filter. The polyphase filter 801 includes series of memory locations 811*a–i* configured in a similar manner as a shift register. In particular, each sample from the kernel 203 is loaded into the first memory location 811*a* at a rate of 11 MHz, and then each sample is serially shifted from left to right through each of the memory locations 811*b–i* at the same rate of 11 MHz. Each sample loaded into the each of the memory locations 811*a–i* is provided to one input of a corresponding one of a series of multipliers 813*a–i*, where each of the multipliers 813*a–i* have a second input for receiving a respective one of the coefficients $c_{0,0}$–$c_{8,0}$. The outputs of the multipliers 813*a–i* are summed at a summing junction 815, which asserts a summed value at an output 817 of the polyphase filter 801. In this manner, the samples are shifted right, multiplied and added at a rate of 11 MHz to provide an 11 MHz output. Each of the polyphase filters 803, 805 and 807 are configured in substantially the same way as the polyphase filter 801, except that different coefficients are used in accordance with the distribution of the discrete-time samples 700. Since there are four polyphase filters 0–3 and since each output is used by the switch 809, the output rate of the pulse shape digital filter 219 is 44 MHz.

It is noted that the case illustrated in FIGS. 7B, 7C, 8A and 8B are specific to w=11 and y=44 in which the rate of the mixed carrier signal is a multiple of the single-carrier rate. Different single-carrier and mixed carrier sample rates are contemplated. In an alternative example for w=11 and y=40, the new rate is not a direct multiple of the single-carrier rate. The single-carrier rate may be up-sampled by the new rate of 40, and the 440 MHz result is then filtered using a low pass filter (LPF) specified as the desired pulse shape. The filtered result is then down-sampled by the original rate of 11 to obtain the new sample rate of 40 MHz. The up-sampling may be achieved using the same number of polyphase filters as the up-sampling rate, such as 40 in this example. The taps of the polyphase filters are programmed with appropriate coefficients in a similar manner as described above for the discrete-time samples 700, except that the time shaping pulse p(t) is sampled at 440 MHz rather than at 44 MHz. The number of taps of each polyphase filter is selected to at least incorporate the samples at the selected sample rate. The down-sampling is achieved by switch logic or circuitry that selects every $w^{th}$ output to achieve the desired rate, such as every $11^{th}$ output to achieve the new rate of 40 MHz (440/11).

Figure 9:
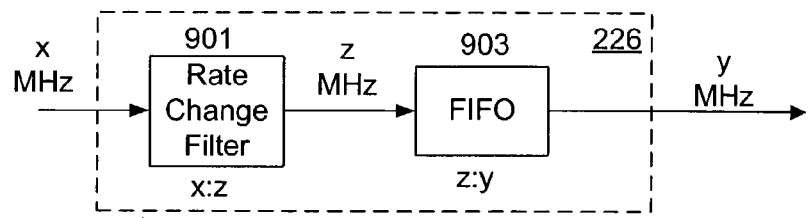
FIG. 9 a simplified block diagram of an exemplary embodiment of the rate change filter of FIG. 2 decomposed into two blocks including an x:z rate change filter for converting to an intermediate and arbitrary rate z MHz and a first-in, first-out (FIFO) buffer for converting between rates z and y MHz.

Referring back to FIG. 2, the rate change filter 226 performs a rate change between x and y and does not perform any particular pulse shaping other than low pass filtering. It is possible that x and y are equal since the sample rates are arbitrary, in which case the rate change filter 226 is not necessary. FIG. 9 a simplified block diagram of an exemplary embodiment of the rate change filter 226 decomposed into two blocks including an x:z rate change filter 901 for converting to an intermediate and arbitrary rate z MHz and a first-in, first-out (FIFO) buffer 903 for converting between rates z and y MHz. Adding the FIFO buffer 903 to the rate change filter is not necessary but may be desired to ease implementation by allowing the rate change filter to operate asynchronously with respect to the input and output sample rates.

If x and y are not equal (or if a different intermediate rate z is desired), the rate change may be performed in a similar manner as described above for the pulse shape digital filter 219 using polyphase filters except that the taps are programmed according to a low pass filter (LPF). If x and y are not direct multiples, conversion may be simplified when x and y are divisible by a common multiple. For example, a conversion from 20 MHz to 44 MHz may employ up-sampling by 11 (rather than 44) and down-sampling by 5 (rather than 20) to achieve the desired conversion since each is divisible by 4 In one embodiment, 11 polyphase filters may be employed, each having 21 taps to achieve the desired sample rate of 220 MHz. Any extra taps may be provided with an appropriate coefficient value, such as zero.

Figure 10:
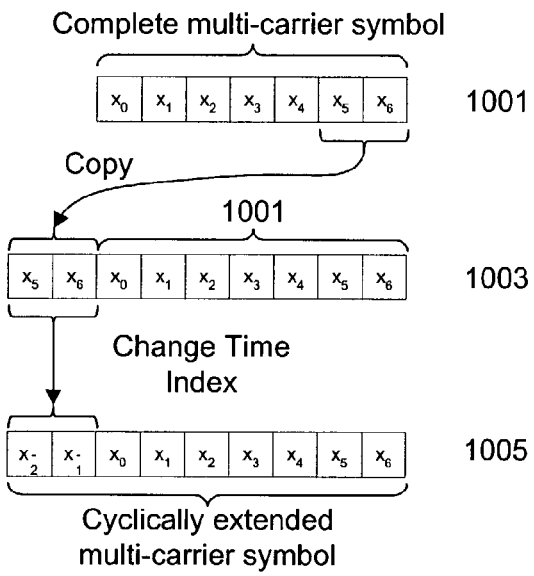
FIG. 10 is a block diagram illustrating cyclic extension of the multi-carrier signal to initialize the rate change filter of FIG. 2 to preclude an unnecessarily long transient.

FIG. 10 is a block diagram illustrating cyclic extension of the multi-carrier signal to initialize the rate change filter 226 to preclude an unnecessarily long transient. A complete multi-carrier symbol 1001 with seven samples $x_0$, $x_1$, $x_2$, $x_3$, $x_4$, $x_5$, $x_6$ is shown having form $x_n$, denoting a sample "x" at a time "n". In this manner, $x_0$ is first in time, $x_1$ is second and so on in which the subscript "n" indicates a time index. The last two samples $x_5$ and $x_6$ are copied and pre-pended to the multi-carrier symbol 1001 as shown at 1003. The time index of the pre-pended samples $x_5$ and $x_6$ are then changed to $x_{-2}$ and $x_{-1}$, respectively, to indicate that they are first in time of a cyclically extended multi-carrier symbol 1005.

Figure 11:
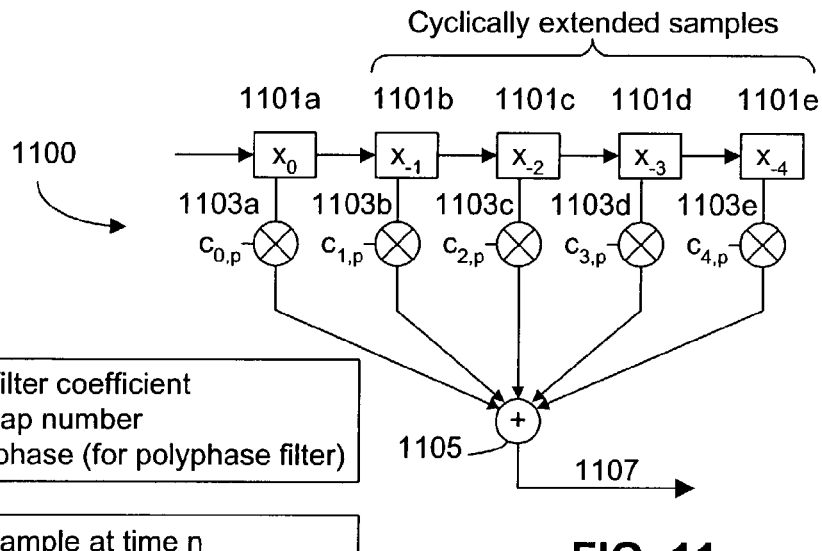
FIG. 11 is a block diagram of a FIR filter similar in format and operation as the polyphase filter of FIG. 8B.

FIG. 11 is a block diagram of a FIR filter 1100 similar in format and operation as the polyphase filter 801. The FIR filter 1100 includes multiple memory locations 1101a–e, and multipliers 1103a–e and a summing junction 1105 to implement an exemplary 5-tap FIR filter with output 1107. Although an exemplary 5-tap filter is shown, it is appreciated that any suitable number of taps may be employed in specific embodiments. The multipliers 1103a–e receive coefficients $c_{t,p}$, where "t" is an index referencing tap number and "p" is an index referencing the phase or polyphase filter number. The memory locations 1101e, 1101d, 1101c and 1101b are pre-loaded with cyclically extended samples $x_{-4}$, $x_{-3}$, $x_{-2}$ and $x_{-1}$, respectively, to initialize the history of the FIR filter 1100 with cyclically extended samples prior to the first actual sample $x_0$.

Referring back to FIGS. 2 and 5, the timing of the combiner 223 is such that the last sample 511 of the single-carrier signal is multiplied by the tap in the pulse shape digital filter 219 with the largest magnitude at the beginning of the transition period 513. Further, the timing of the combiner 223 is such that the first full multi-carrier sample 509 of the multi-carrier signal is multiplied by the tap in the rate change filter 226 with the largest magnitude at the end of the transition period 513. If the polyphase filter 801 is employed as the first filter of the pulse shape digital filter 219, then the last sample of the single-carrier signal from the kernel 203 is located at memory location 811e at the beginning of the transition period 513. This last sample is multiplied by the largest coefficient $c_{4,0}$ corresponding to the discrete sample 701. Also, if the FIR filter 1101 is used as the first polyphase filter of the rate change filter 226, then the first full sample of the multi-carrier signal is located at memory location 1101c at the end of the transition period 513.

Figure 12:
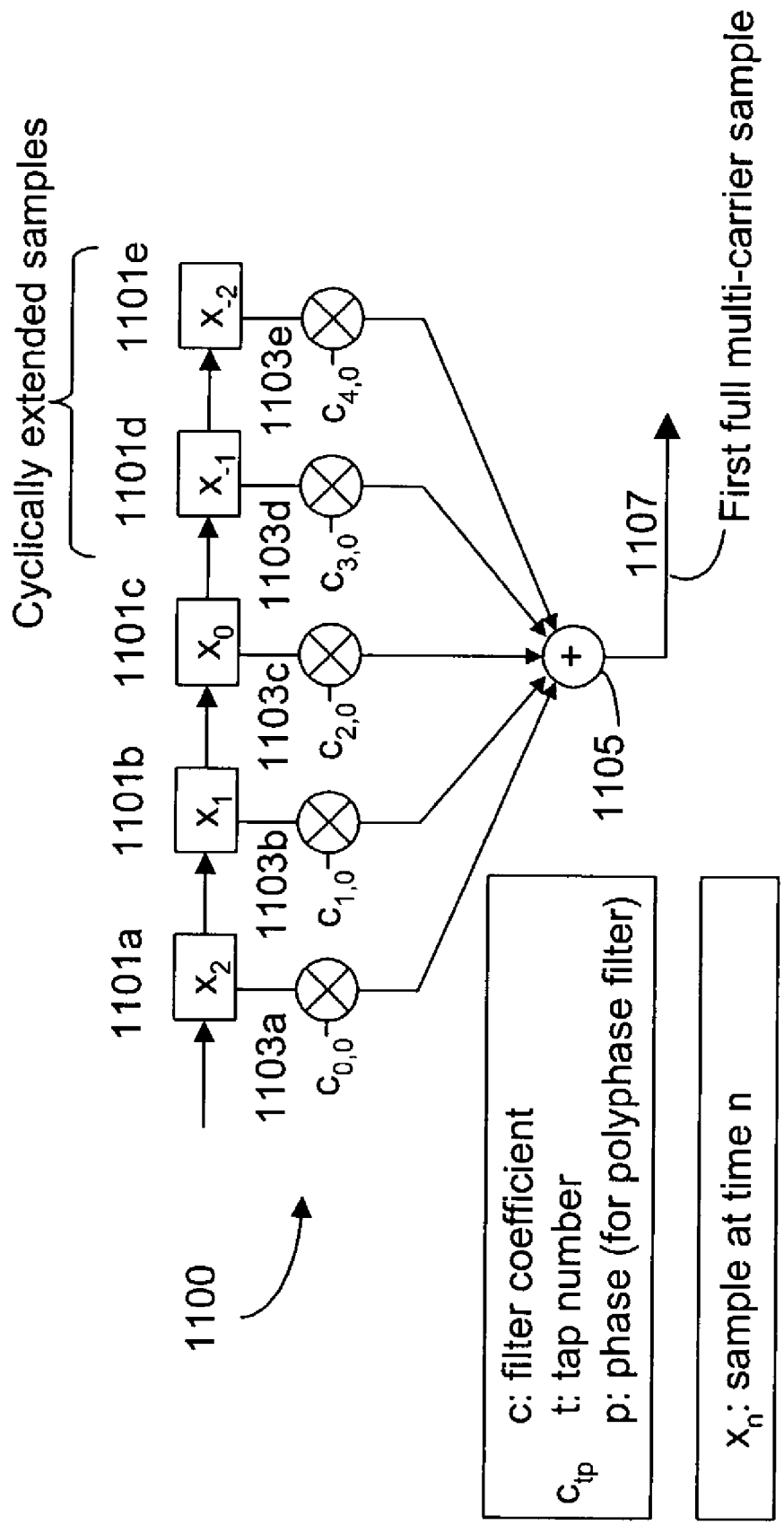
FIG. 12 is a block diagram illustrating the FIR filter of FIG. 11 used as the first polyphase filter (phase or polyphase filter number=0) with the first full sample of the multi-carrier signal at the middle memory location having the largest coefficient.

FIG. 12 is a block diagram illustrating the FIR filter 1101 used as the first polyphase filter (phase or polyphase filter number=0) with the first full sample $x_0$ of the multi-carrier signal at the middle memory location 1101c having the largest coefficient $c_{2,0}$. If the FIFO buffer 903 is also used, then any delay through this buffer is taken into account to ensure proper timing of the symbols. It is appreciated that the last sample of the single-carrier signal is shifted through the polyphase filter 801 during ramp down of the single-carrier signal while the cyclically extended portion of the multi-carrier signal is propagating through the FIR filter 1101 during ramp up of the multi-carrier signal during the transition period 513.

Figure 13:
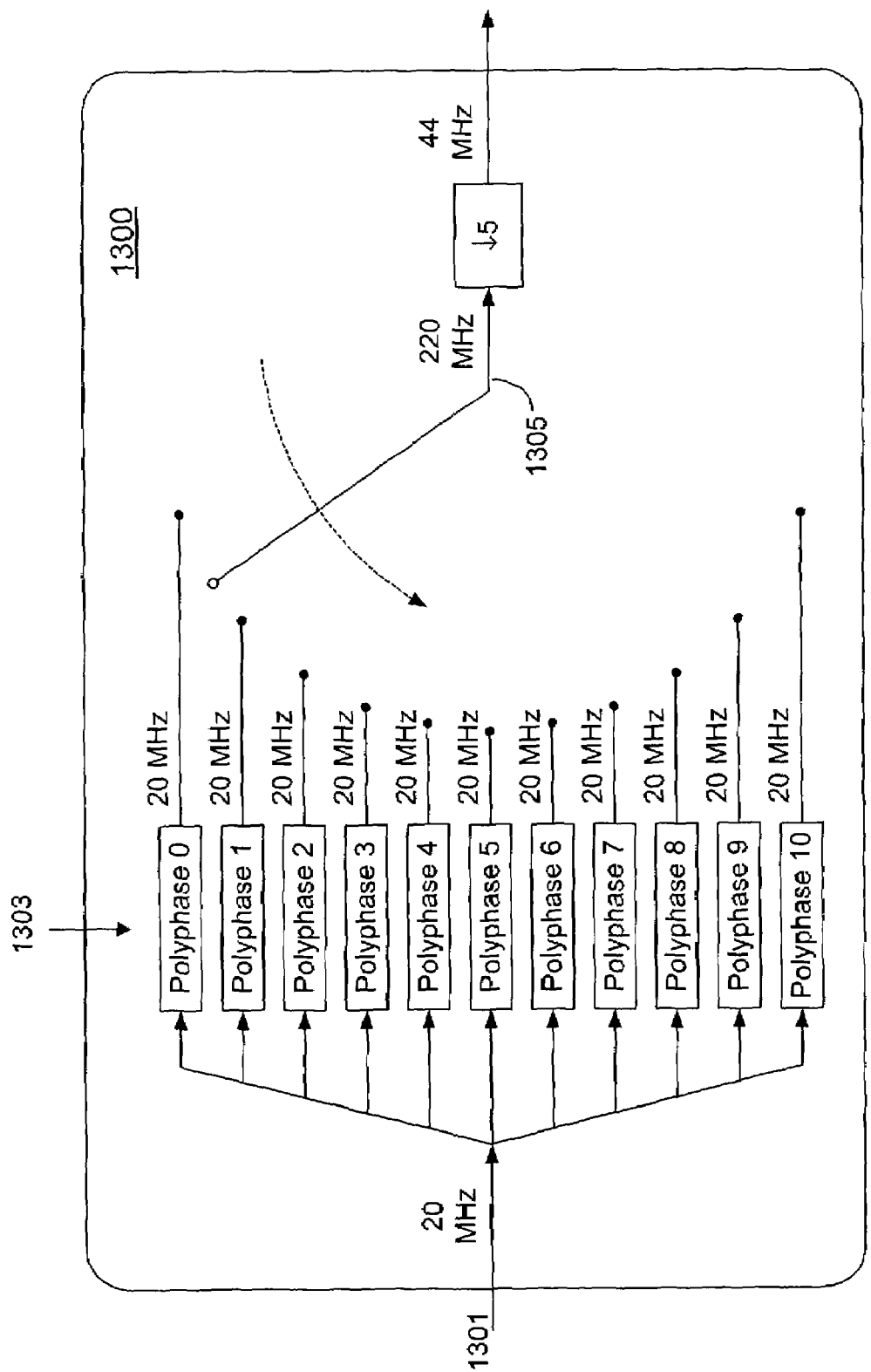
FIG. 13 is a block diagram of an exemplary rate change filter that may be used to convert a 20 MHz sample rate to a 44 MHz sample rate.

FIG. 13 is a block diagram of an exemplary rate change filter 1300 that may be used to convert a 20 MHz sample rate to a 44 MHz sample rate. The rate change filter 1300 may be used, for example, as the rate change filter 226 for x=20 and y=44 The signal at a 20 MHz sample rate are received at an input 1301 and provided to each input of 11 polyphase filters 1303 individually labeled 0–10. Each of the polyphase filters 1303 operates at 20 MHz so that the collective outputs of the polyphase filters 1303 provides an intermediate rate or frequency of 11 times 20 or 220 MHz. Each of the polyphase filters 1303 is configured as a FIR filter similar to the FIR filter 1100 with a plurality of filter taps. The number of filter taps is determined by the intermediate frequency of 220 MHz, and in the embodiment shown each filter includes 21 taps. A sample switch 1305 selects every $5^{th}$ filter output to down-sample the intermediate frequency rate by 5 to achieve the new sample rate of 44 MHz. For example, in a first pass, the sample switch 1305 selects the outputs of polyphase filters 0, 5 and 10. In the second-sixth consecutive passes, the sample switch 1305 selects the outputs of polyphase filters 4 and 9, 3 and 8, 2 and 7, 1 and 6, and 0, 5 and 10, respectively. Operation repeats in this manner for the entire signal segment.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention.

The invention claimed is:

1. A Baseband transmitter for a radio frequency (RF) communication device, comprising:
   a single-carrier processor that generates a single-carrier signal at a first sample rate;
   a pulse shape filter, coupled to the single-carrier processor, that includes a plurality of polyphase filters which filter the single-carrier signal according to a time shaping pulse that approximates a multi-carrier power spectrum and a sample switch that selects outputs of the plurality of polyphase filters at a second sample rate;
   a multi-carrier processor that generates a multi-carrier signal at the second sample rate; and
   a signal combiner, coupled to the pulse shape filter and the multi-carrier processor, that combines the filtered single-carrier signal with the multi-carrier signal while maintaining phase, gain, frequency and timing alignment.

2. The Baseband transmitter of claim 1, wherein the time shaping pulse is sampled and decomposed into the plurality of polyphase filters of the pulse shape filter in accordance with the second sample rate.

3. The Baseband transmitter of claim 2, wherein a selected number of polyphase filters is used to up-sample the single-carrier signal to an intermediate rate, wherein the time shaping pulse is sampled based on the intermediate rate, wherein each of the polyphase filters has a selected number of taps that incorporate tap coefficients based on samples of the time shaping pulse, and wherein the sample switch selects outputs of the plurality of polyphase filters to down-sample to the second sample rate.

4. The Baseband transmitter of claim 2, wherein a selected number of polyphase filters is used to up-sample the single-carrier signal to the second sample rate, wherein the time shaping pulse is sampled according to the second sample rate, wherein each of the polyphase filters has a selected number of taps that incorporate tap coefficients based on samples of the time shaping pulse, and wherein the sample switch selects each output of the plurality of polyphase filters at the second sample rate.

5. The Baseband transmitter of claim 4, wherein the first sample rate is 11 megahertz (MHz), wherein the second sample rate is 44 MHz, wherein the time shaping pulse is converted to discrete samples based on a 44 MHz rate, and wherein 11 polyphase filters are used with 9 taps each.

6. The Baseband transmitter of claim 2, wherein a first of the plurality of polyphase filters is selected to have a center tap having a coefficient that corresponds with a peak magnitude of the sampled time shaping pulse.

7. The Baseband transmitter of claim 6, further comprising:
the signal combiner comprising:
a combiner, coupled to a phase multiplier, that combines the filtered single-carrier signal with the multi-carrier signal and provides a combined mixed carrier signal; and
a soft switch, coupled to the combiner, that selects the filtered single-carrier signal until a last sample is completed and that selects the combined mixed carrier signal during a transition period; and
the last sample of the single-carrier signal at the first sample rate being positioned at the center tap of the first polyphase filter at the beginning of the transition period.

8. The Baseband transmitter of claim 1, further comprising:
the multi-carrier processor generating a multi-carrier signal at a third sample rate rather than the second sample rate; and
a rate change filter, coupled to the multi-carrier processor, that converts the multi-carrier signal from the third sample rate to the second sample rate.

9. The Baseband transmitter of claim 8, wherein the rate change filter further comprises:
an internal rate change filter that converts a sample rate of the multi-carrier signal from the third sample rate to a fourth sample rate; and
a first-in, first-out (FIFO) buffer, coupled to an output of the internal rate change filter, that converts the multi-carrier signal from the fourth sample rate to the second sample rate.

10. The Baseband transmitter of claim 8, wherein the rate change filter comprises a plurality of polyphase filters that up-sample to an intermediate frequency and a sample switch that selects outputs of the plurality of polyphase filters at the second sample rate.

11. The Baseband transmitter of claim 10, wherein a selected number of polyphase filters of the rate change filter is used to up-sample the multi-carrier signal to the intermediate frequency, wherein each of the polyphase filters has a selected number of filter taps with coefficients to incorporate a low pass filter (LPF) based on the intermediate frequency, and wherein the sample switch selects outputs of the plurality of polyphase filters to down-sample the multi-carrier signal to the second sample rate.

12. The Baseband transmitter of claim 11, wherein the third sample rate is 20 megahertz (MHz), wherein the second sample rate is 44 MHz, wherein 11 polyphase filters are used with 21 taps each, and wherein the sample switch selects every $5^{th}$ output of the 11 polyphase filters to achieve a 44 MHz rate.

13. The Baseband transmitter of claim 10, wherein a center tap of a first polyphase filter of the plurality of polyphase filters of the rate change filter is selected to have a largest magnitude coefficient.

14. The Baseband transmitter of claim 13, wherein the plurality of polyphase filters of the rate change filter are each initialized with a cyclic extension of a first multi-carrier symbol.

15. The Baseband transmitter of claim 14, wherein the signal combiner further comprises:
a phase multiplier that multiplies the multi-carrier signal by a phase based on the single-carrier signal and that provides a rotated multi-carrier signal;
a combiner, coupled to the phase multiplier, that combines the filtered single-carrier signal and the rotated multi-carrier signal and provides a combined mixed carrier signal; and
a soft switch, coupled to the combiner, that selects the filtered single-carrier signal until completed, that selects the combined mixed carrier signal during a transition period, and that selects the rotated multi-carrier signal at the end of the transition period until completed.

16. The Baseband transmitter of claim 15, wherein the single-carrier signal includes consecutive chips according to a predetermined timing interval and wherein the transition period has a duration equivalent to the predetermined timing interval.

17. The Baseband transmitter of claim 16, further comprising:
the time shaping pulse being sampled and decomposed into the plurality of polyphase filters of the pulse shape filter, a center tap of a first of the plurality of polyphase filters being selected to have a coefficient that corresponds with a peak magnitude of the sampled time shaping pulse;
the combiner operated so that a last chip of the single-carrier signal is located at the center tap of the first of the plurality of polyphase filters of the pulse shape filter at the beginning of the transition period; and
the combiner operated so that a first full sample of the multi-carrier signal is located at the center tap of the first polyphase filter of the plurality of polyphase filters of the rate change filter at the end of the transition period.

18. A method of generating a mixed carrier packet for radio frequency (RF) transmission, comprising:
generating a single-carrier segment including a preamble and header according to a single-carrier modulation scheme that provide single-carrier samples at a first sample rate;
filtering the single-carrier samples according to a time shaping pulse that approximates a multi-carrier power spectrum and selecting filtered samples at a second sample rate;
generating a multi-carrier payload using a selected multi-carrier modulation scheme that provides multi-carrier samples at the second sample rate; and
combining the single-carrier segment with the multi-carrier payload to provide a mixed carrier packet in such a manner to maintain gain, phase, frequency and timing.

19. The method of claim 18, wherein said combining comprises first selecting the single-carrier filtered samples, second combining the single-carrier filtered samples with the multi-carrier samples during a transition period in such a manner to maintain gain, phase, frequency and timing, and third selecting the multi-carrier samples.

20. The method of claim 18, wherein said filtering the single-carrier samples comprises up-sampling to an intermediate rate using a plurality of finite impulse response (FIR) filters each having multiple taps with coefficients selected according to discrete samples of the time shape pulse based on the intermediate rate.

21. The method of claim 20, wherein the intermediate rate is equal to the second sample rate and wherein said selecting filtered samples comprises selecting each output of the plurality of FIR filters at the second sample rate.

22. The method of claim 20, wherein the intermediate rate is greater than the second sample rate, and wherein said selecting filtered samples comprises down-sampling outputs by selecting outputs of the plurality of FIR filters to achieve the second sample rate.

23. The method of claim 20, further comprising selecting the coefficients so that a center tap of a first FIR filter has a coefficient that corresponds with a peak value of the time shaping pulse.

24. The method of claim 23, wherein said combining the single-carrier segment with the multi-carrier payload comprises selecting an output of the first FIR filter when a last sample of the single-carrier segment is positioned at the center tap of the first FIR filter at the beginning of a transition period between the single-carrier segment and the multi-carrier payload of the mixed carrier packet.

25. The method of claim 18, further comprising:
said generating a multi-carrier payload comprising providing multi-carrier samples at a third sample rate rather than the second sample rate;
rate change filtering the multi-carrier samples from the third sample rate to a fourth sample rate; and
buffering the multi-carrier samples using a first-in, first-out (FIFO) buffer and selecting outputs of the FIFO buffer at the second sample rate.

26. The method of claim 18, further comprising:
said generating a multi-carrier payload comprising providing multi-carrier samples at a third sample rate rather than the second sample rate; and
rate change filtering the multi-carrier samples from the third sample rate to the second sample rate.

27. The method of claim 26, wherein said rate change filtering the multi-carrier samples comprises up-sampling to an intermediate frequency using a plurality of finite impulse response (FIR) filters each having a number of taps determined by the intermediate frequency and tap coefficients selected according to a low pass filter (LPF) based on the intermediate frequency.

28. The method of claim 27, further comprising selecting a center tap of a first FIR filter of the plurality of FIR filters to have a largest magnitude tap coefficient.

29. The method of claim 28, further comprising initializing filter taps of a rate change filter with a cyclical extension of a first multi-carrier symbol of the multi-carrier samples.

30. The method of claim 29, wherein said combining the single-carrier segment with the multi-carrier payload comprises selecting an output of the first FIR filter of the rate change filter when a first full sample of the first multi-carrier symbol of the multi-carrier payload is positioned at the center tap of the first FIR filter of the rate change filter at the end of a transition period between the single-carrier segment and the multi-carrier payload of the mixed carrier packet.

31. The method of claim 30, further comprising:
said filtering the single-carrier samples comprises up-sampling using a plurality of FIR filters each having a number of taps with tap coefficients selected based on discrete samples of the time shape pulse;
selecting the tap coefficients of the plurality of FIR filters used for up-sampling so that a center tap of a first FIR filter has a coefficient that corresponds with a peak value of the time shaping pulse; and
said combining the single-carrier segment with the multi-carrier payload comprising selecting an output of the first FIR filter when a last sample of the single-carrier segment is positioned at the center tap of the first FIR filter at the beginning of the transition period.

32. The method of claim 31, wherein said combining further comprises rotating the multi-carrier payload by a phase determined from the filtered single-carrier segment.

33. The method of claim 32, the single-carrier modulation scheme comprising Barker modulation and the multi-carrier modulation scheme comprising orthogonal frequency division multiplexing (OFDM), wherein said rotating comprises rotating an OFDM multi-carrier payload by a phase of a last Barker Word of the filtered single-carrier segment.

34. The method of claim 33, wherein said combining comprises ramping the filtered single-carrier segment down while ramping the multi-carrier payload up during the transition period.

* * * * *